United States Patent
Catarineu Guillén

(10) Patent No.: US 6,296,911 B1
(45) Date of Patent: Oct. 2, 2001

(54) METHOD FOR OBTAINING THE CHROMATIC VARIATION OF OBJECTS, IN RESPONSE TO EXTERNAL STIMULI, AND A PRODUCT OBTAINED THEREBY

(76) Inventor: Leonardo Catarineu Guillén, Capilla, 21, La Floresta (Barcelona) (ES), 08190

( * ) Notice: Subject to any disclaimer, the term of this patent is extended or adjusted under 35 U.S.C. 154(b) by 0 days.

(21) Appl. No.: 09/234,196

(22) Filed: Jan. 20, 1999

(30) Foreign Application Priority Data

Jan. 20, 1998 (ES) .................................................. 9800092

(51) Int. Cl.$^7$ ...................................................... B44F 1/10
(52) U.S. Cl. .......................... 428/29; 428/195; 428/207; 428/690; 428/913; 252/301.16; 106/400
(58) Field of Search ............................ 428/96, 195, 207, 428/690, 913, 29; 106/400; 252/301.16

(56) References Cited

U.S. PATENT DOCUMENTS 5,298,190 3/1994 Mone et al. .
5,795,379 * 8/1998 Schwenk et al. .................... 106/499

FOREIGN PATENT DOCUMENTS

| | | |
|---|---|---|
| 8206606 | 10/1981 | (ES) . |
| 2034206 | 4/1993 | (ES) . |
| 7/258568 | 9/1995 | (JP) . |
| 7/276733 | 4/1997 | (JP) . |
| WO 98/07787A1 | 2/1998 | (WO) . |

OTHER PUBLICATIONS

Patent Abstracts of Japan, CD–ROM MIPAJ 9704 PAJ JP–09–095875 Apr. 18 1997.
Patent Abstracts of Japan, CD–ROM MIPAJ 9510 PAJ JP–07–258568 Oct. 9 1995.

* cited by examiner

*Primary Examiner*—Deborah Jones
*Assistant Examiner*—Abraham Bahta
(74) *Attorney, Agent, or Firm*—Darby & Darby

(57) ABSTRACT

A method for obtaining the chromatic variation of objects, in response to external stimuli, and a product obtained thereby. The method comprises the incorporation in the desired objects of various pigments having combined effects comprising a luminescent pigment, a thermochromic pigment permitting the change in the color according to the temperature and/or a hygroscopic pigment which will provoke a variation in the chromatic characteristics according to humidity. The objects manufactured make it possible to obtain effects of luminescence and of chromatic variation as the temperature and humidity vary.

6 Claims, No Drawings

METHOD FOR OBTAINING THE CHROMATIC VARIATION OF OBJECTS, IN RESPONSE TO EXTERNAL STIMULI, AND A PRODUCT OBTAINED THEREBY

The present invention relates to a method and product which are intended to enable a variable support to be sensitive to different external stimuli such as the intensity of illumination, ambient humidity and temperature, reflecting the effects of these in its chromatic characteristics.

At present, different types of phosphorescent products are known which are applied as a coating for objects or as an integral part of the material of the latter, or as a laminar covering or in the form of paint in order to cause the said laminar or other type of objects to have a phosphorescent effect. It makes it possible to manufacture different objects which have a certain luminous brightness in the dark, that is to say, they exhibit phosphorescence.

The present invention is intended to disclose a new method and corresponding products in order to enable that the objects to which there are applied the products manufactured in accordance with the present invention to possess chromatic characteristics varying according to different stimuli. In particular, the object of the present invention consists in obtaining objects which simultaneously have phosphorescent characteristics and additionally exhibit chromatic variation and variation of the intensity of the luminescence as the humidity and/or temperature vary. It will therefore be understood that the present invention will make it possible to obtain a series of new and advantageous functions and that it will be applicable to a very wide field of different objects in real life, such as different types of toys, coverings for areas of walls, for example, by means of stickers that can be applied also to furniture or to other places, or as a mouldable mass for producing different types of objects, for paints, obtaining by their application the result that the new chromatic characteristics are transmitted to the objects receiving them, for inks for different applications, printing of textiles, coating of cables in order to obtain indications of humidity and/or excess temperature, granulates and raw materials for the manufacture of other objects, etc.

The method which is the subject of the present invention will be based especially on the formation of one or more suspensions, with a base which is preferably transparent or translucent, which are intended to include a photoluminous, that is to say, luminescent, pigment, a pigment having chromatics which vary with humidity, and another pigment or pigments which vary in colour with the temperature. A single suspension or a plurality of suspensions may be produced, in such a manner that in the case of a single suspension the different pigments will be incorporated in it, and in the case of a plurality of suspensions being constituted, the pigments mentioned will remain in suspension individually in each of them or combined in pairs, preferably adopting in the case of multiple suspensions a liquid consistency in order to allow the application of the suspensions in the form of successive layers on the object on which it is desired to obtain the effects of combined variation of luminescence and colour. The bases to be used may be of very different types, for example, plastic granules, transparent vinyl base for paints (liquid), liquid acrylic base, etc. In the case of application of the suspensions in the form of several layers it is preferable for the outer layers to be transparent and porous so as to allow the entry of light to the pigment-bearing layer or layers, the luminosity of which is excited by the action of light, providing a specific period of luminescence in the dark.

To implement the present invention, variable specific pigments may be used, provided that they produce the effects indicated. There may be mentioned, for example, as luminescent pigments, the ZnS-based pigments or others, in particular the LUMILUX pigments manufactured by the German company Riedel-de Haën. However, it is clear that any luminescent pigment, that is to say, which has a luminous effect in the dark, could be used for the present invention.

As a pigment the chromatics of which depend on the humidity, there may be mentioned, for example, cobalt chloride and the like or any other tracer pigments the colour of which depends on the humidity.

As temperature-sensitive pigments or thermochromic pigments there may be mentioned cobalt iodide or any other which has analogous properties of colour change in response to the temperature, for example, those termed AZUL BEZA-THERM B from the Swiss company CHT.

Although the most complete combination of pigments will be that which contains photoluminous pigments, thermo-chromic pigments and pigments the chromatics of which are sensitive to humidity, it will also be possible to use photoluminous pigments combined only with hygrometric pigments or with thermochromic pigments.

The base or background will preferably be white, silver or a reflective colour, although the different suspensions of pigments may be arranged on any base material.

The percentages of the different pigments in relation to the suspension may also vary within wide limits, the following being indicated by way of example: pehotoluminous pigment : preferably based on ZnS: Cu, of
0.1% to 350% by weight related to the base
humidity-sensitive pigment : preferably cobalt chloride, from 0.01% to 50%
thermochromic pigment : preferably cobalt iodide, from 0.01% to 50%.

With regard to the applications, there have already been briefly indicated the most important ones, which can be specified in more detail as follows:

One of the most current applications will consist in the manufacture of plastic adhesives or paper adhesives of the sticker type for adhering to any surface, such as ceilings, furniture, walls, files, books, motor vehicles and many others, preferably comprised of a base sheet of plastic, paper, cardboard, metal, wood, etc., soft or flexible, rigid or semi-rigid, which has on one of its faces one or more layers of a luminescent nature and properties combined with pigments sensitive to humidity and/or sensitive to temperature, which may be incorporated in the same layer or in several successive layers, in which case the layers should have properties of transparency and porosity in order to allow light and humidity to pass, as well as the action of heat. The other face of the sheet is provided with a substance of an adhesive nature which can be protected by a laminar element to be removed before using the adhesive and allowing the support to be adhesively secured in the desired location.

The adhesive material mentioned above may likewise be obtained by applying to the upper face of an adhesive tape of a normal commercial type, for example of the type called Iron Fix, a layer of extruded or calendered PVC which contains the pigments mentioned previously, being applied permanently to the above-mentioned support. After the application of the pigments, they can be printed by additional graphic impression of the thermoprinting, vinyl or acrylic printing, offset printing, pad printing, silk screen printing, typographic, transfer or laser printing type, etc., drawings of any type making it possible to reproduce constellations, human figures, or figures of animals, angels or other motifs, polychromatic or otherwise, these likewise being able to be only silhouettes, and all being able to be applied also before or after other polychromed printing of a type customarily used, such as offset printing, silk screen printing, etc., which serves for the reproduction of images. In the case of this adhesive being intended to represent stars, constellations or cosmic figures, a more coherent result will be obtained in so far as their apparent colour is variable, a more realistic evocation thereof being obtained.

Another application of the present invention may be achieved by obtaining a mass with suspension of pigments having a base of translucent oils and paraffins used in the socalled conventional plastic masses for moulding, obtaining a mass with chromatic characteristics varying both by day and night in response to the humidity and/or temperature, according to the hygrometric or heat-sensitive pigments incorporated in the mass together with the luminescent pigments.

Another application of the present invention will be that of obtaining special paints by means of which the desired characteristics of chromatic and luminescent variation are obtained on the outer, visible surface of the painted objects.

Likewise, the present invention may be applied in a manner similar to the applications mentioned previously, to serigraphic inks in a similar form to the paints preferably using transparent or translucent bases of the types customarily used in silk screen printing, which may be vinyl or acrylic varnishes or varnishes improved for their fixing and drying, such as the bases used for UVI with or without thickeners and with or without elastifiers of the D.O.P. type, it being also possible to use other additives in order to improve the quality of the ink, provided that they do not affect the properties of combination of the luminescent pigments with the hygroscopic and/or thermochromic pigments.

Another application of the present invention will be that of inks for offset printing similar to those mentioned previously, but using bases of liquid solutions suitable for offset inks.

The present invention may also be used for the printing of fabrics, using bases of translucent acrylic or vinyl suspension of the type customarily used in the manufacture of printing pastes, in the same or similar percentages to the inks mentioned previously.

Another application may consist of a granulate for injection-moulding of plastics material or for extrusion and/or calendering, the aforesaid pigments being suspended in a liquid or semi-solid translucent solution of PVC, polystyrene, polypropylene, etc., in suitable percentages of the order of those mentioned previously.

Another application of the present invention may consist of eraser rubbers, using the pigments in the percentages indicated and forming a translucent mass having the characteristics conventionally indicated for obtaining an eraser rubber.

Finally, although it should not be regarded as being limitative, another example of coating will be that of cables for industrial application, in which it is necessary to obtain indications of humidity and/or excess temperature of the cable or of the component involved in conditions of poor light or after its illumination for some moments.

As will be understood, the present invention may also be used for the manufacture of small objects such as sensitive elements of nocturnal hygrometers, advertising hoardings, ashtrays, knife handles, key rings, cigarette lighter bases, and others, as well as nautical applications and as sensitive elements for meteorological measuring instruments or other objects.

What is claimed is:

1. Objects having chromatic variation, in response to external stimuli, both with daytime vision and night vision, the incorporation in said objects of at least one of a luminescent pigment, a thermochromic pigment to allow variation in color according to temperature and a hygroscopic pigment that varies in chromatic characteristics according to humidity, said pigments being in conjoint form in their mass.

2. Objects in accordance with claim 1, wherein the combination of pigments are incorporated by means of successive layers applied to the mass of the object.

3. Objects in accordance with claim 2, wherein the combinations of pigments are included by means of successive layers of paint.

4. Objects in accordance with claim 1, wherein the combination of pigments is applied to one side of a laminar support, and adhesive applied to another side of the laminar support.

5. Objects in accordance with claim 1, wherein the combination of pigments are in a mass having permanent moldable characteristics.

6. Objects in accordance with claim 1, wherein the combination of pigments were incorporated in the object by injection molding of a plastic mass which contains them.

* * * * *